Figure 1:
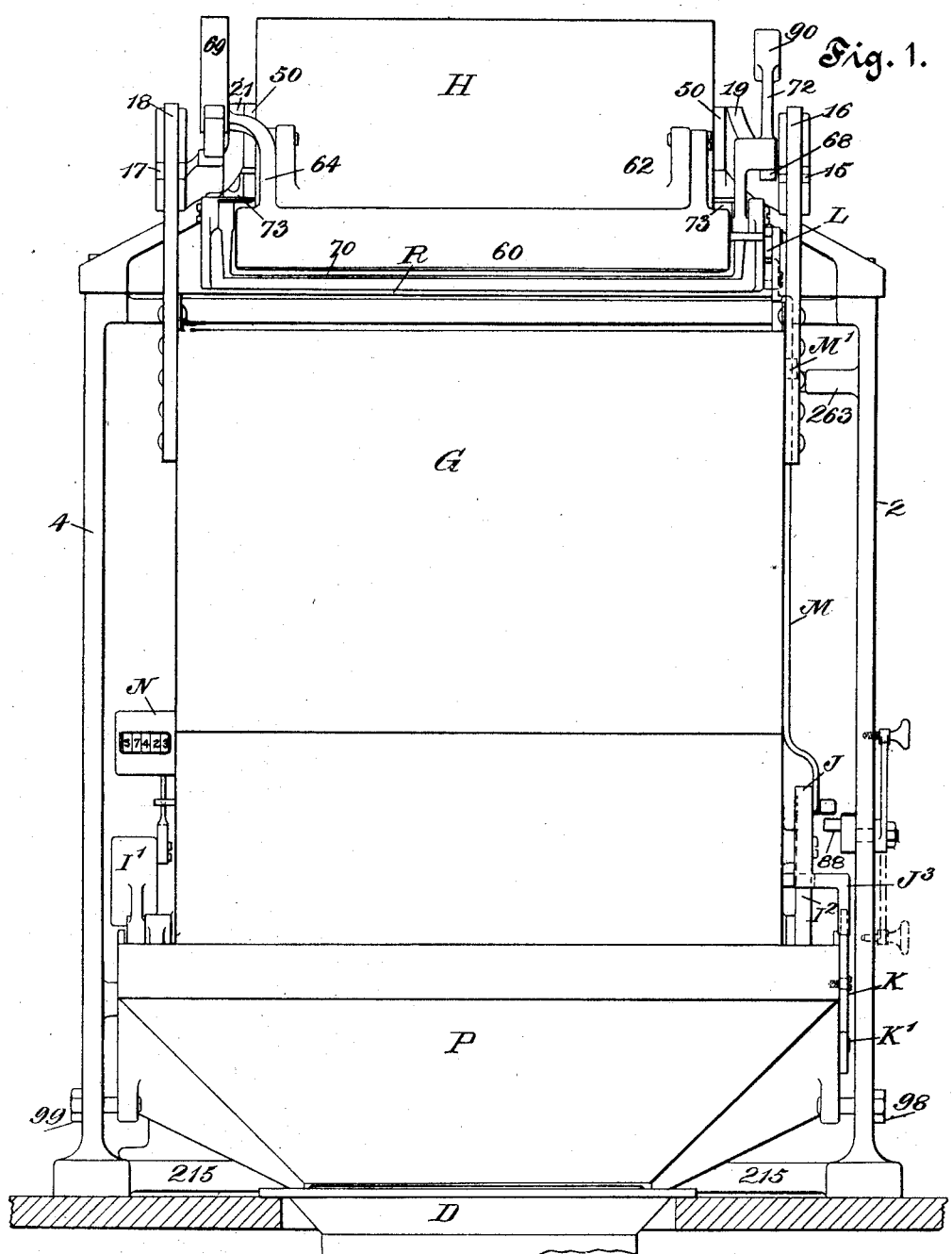

No. 632,675. Patented Sept. 5, 1899.
C. H. COOLEY.
AUTOMATIC WEIGHING MACHINE.
(Application filed May 31, 1895.)

(No Model.) 9 Sheets—Sheet 1.

Witnesses.
A. Mutter.
Jennie Nellis.

Inventor.
Charles H. Cooley;
By his Attorney,
W. H. Honiss.

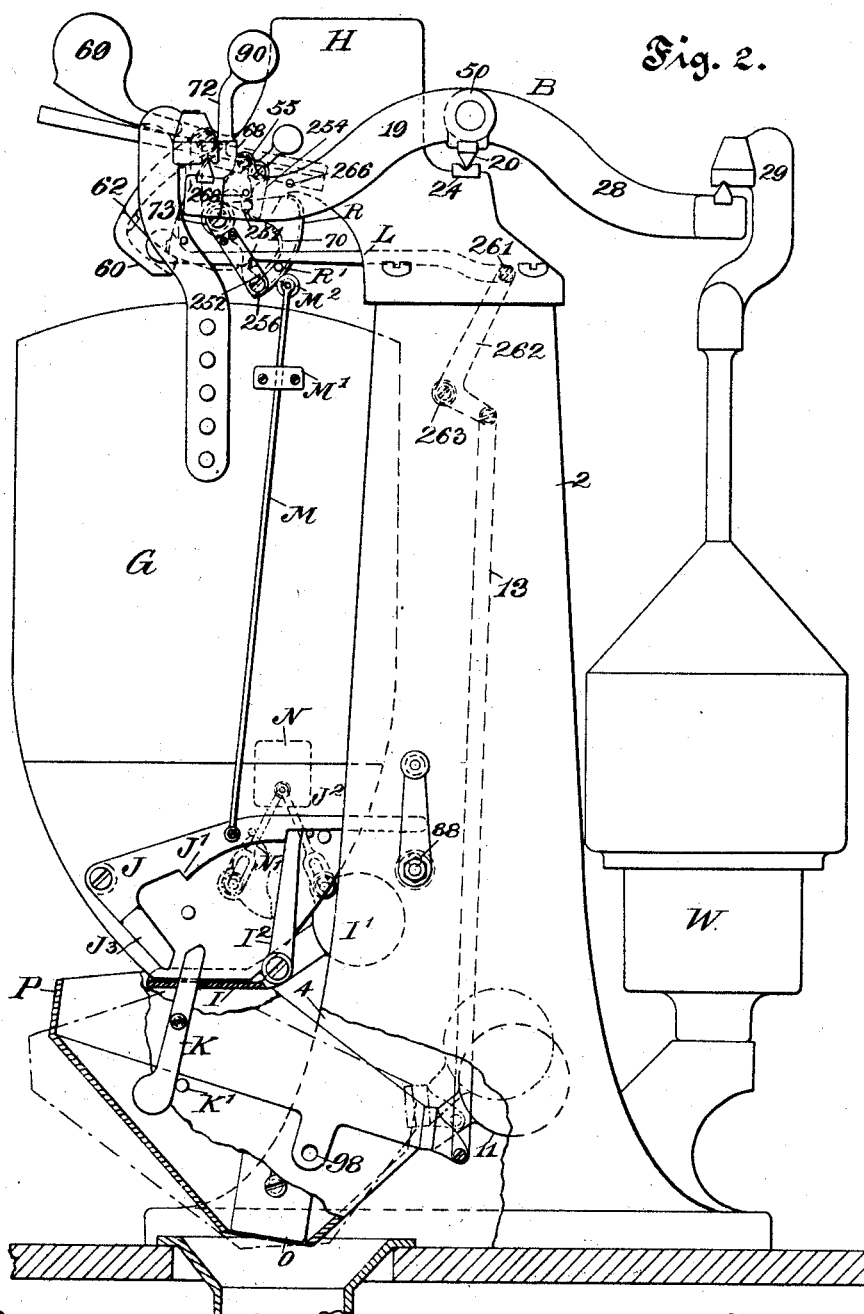

No. 632,675. Patented Sept. 5, 1899.
C. H. COOLEY.
AUTOMATIC WEIGHING MACHINE.
(Application filed May 31, 1895.)
(No Model.) 9 Sheets—Sheet 3.
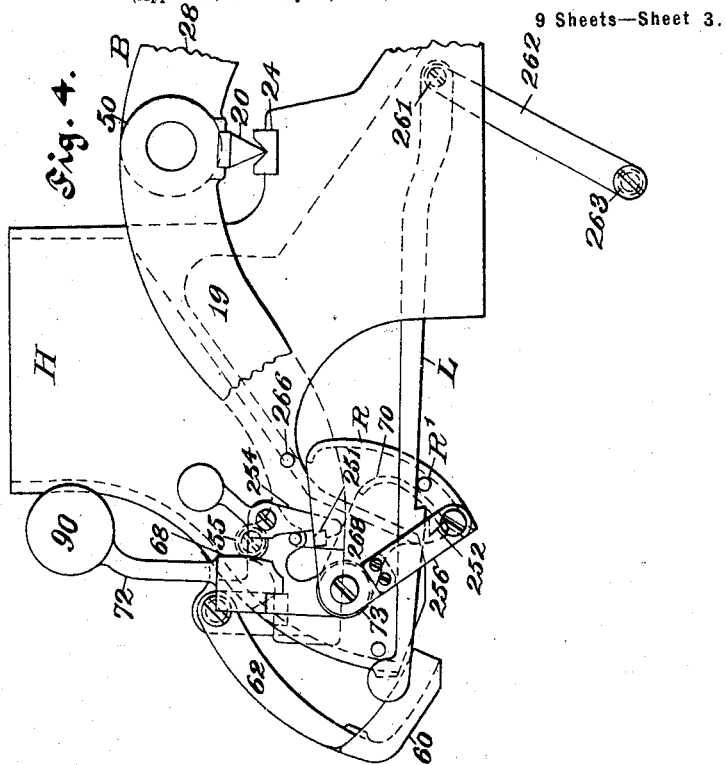
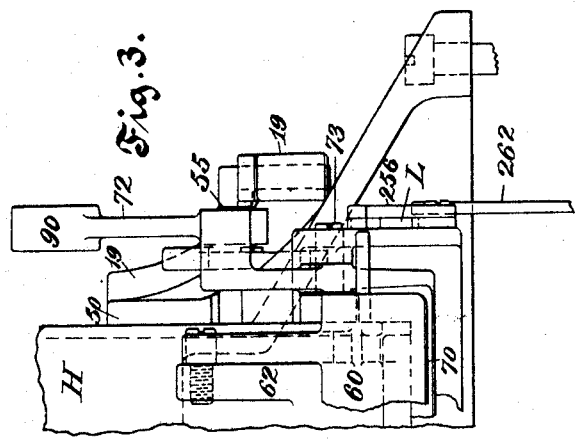
Witnesses.
A. Mutter.
Jennie Kelli.
Inventor.
Charles H. Cooley;
By his Attorney,
W. H. Honiss.

No. 632,675. Patented Sept. 5, 1899.
C. H. COOLEY.
AUTOMATIC WEIGHING MACHINE.
(Application filed May 31, 1895.)

(No Model.) 9 Sheets—Sheet 4.

Witnesses.
A. Mutter
Jennie Nellis

Inventor.
Charles H. Cooley;
By his Attorney,
W. H. Honiss

No. 632,675. Patented Sept. 5, 1899.
C. H. COOLEY.
AUTOMATIC WEIGHING MACHINE.
(Application filed May 31, 1895.)

(No Model.) 9 Sheets—Sheet 5.

Witnesses.
A. Mutter.
Jennie Nellis.

Inventor.
Charles H. Cooley;
By his Attorney,
W. H. Honiss.

No. 632,675. Patented Sept. 5, 1899.
C. H. COOLEY.
AUTOMATIC WEIGHING MACHINE.
(Application filed May 31, 1895.)
(No Model.) 9 Sheets—Sheet 6.

Witnesses.
A. Mutter.
Jennie Kellis

Inventor.
Charles H. Cooley;
By his Attorney;
W. H. Honiss

No. 632,675. Patented Sept. 5, 1899.
C. H. COOLEY.
AUTOMATIC WEIGHING MACHINE.
(Application filed May 31, 1895.)

(No Model.) 9 Sheets—Sheet 8.

Witnesses.
A. Mutter.
Jennie Nellis.

Inventor.
Charles H. Cooley;
By his Attorney,
W. H. Honiss.

THE NORRIS PETERS CO., PHOTO-LITHO., WASHINGTON, D. C.

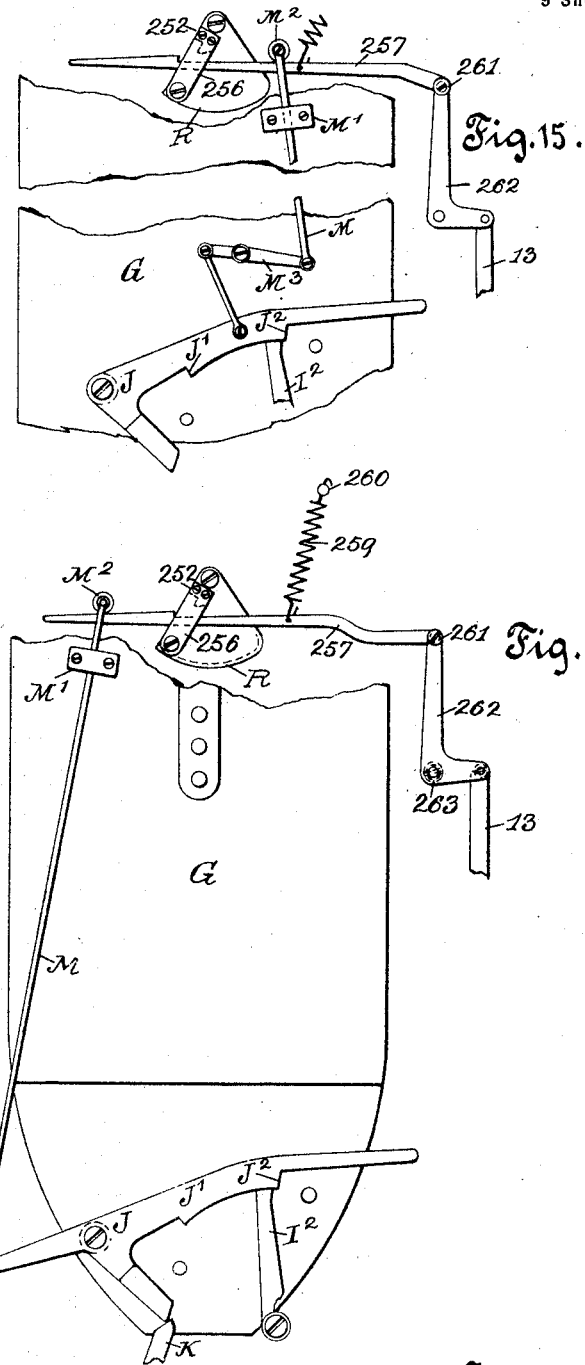

UNITED STATES PATENT OFFICE.

CHARLES H. COOLEY, OF HARTFORD, CONNECTICUT, ASSIGNOR TO THE PRATT & WHITNEY COMPANY, OF SAME PLACE.

AUTOMATIC WEIGHING-MACHINE.

SPECIFICATION forming part of Letters Patent No. 632,675, dated September 5, 1899.

Application filed May 31, 1895. Serial No. 551,071. (No model.)

*To all whom it may concern:*

Be it known that I, CHARLES H. COOLEY, a citizen of the United States, residing at Hartford, in the county of Hartford and State of Connecticut, have invented certain new and useful Improvements in Automatic Weighing-Machines, of which the following is a full, clear, and exact specification.

This invention relates to that class of automatic weighing-machines which are provided with a single bucket and which are of the same general form and character as the machine shown in Letters Patent No. 529,246, dated November 13, 1894, to which reference should be made, the object of the present invention being to provide an improved organization of mechanism so combined and adapted as to make the operation of that machine more safe, positive, and convenient. It includes important improvements in the form and arrangement of the various elements of the machine and also in the means whereby they are connected and caused to be operated in their proper sequence, including also means whereby the operation of the machine is entirely stopped whenever the principal elements become deranged, so that they fail to perform their proper functions. It comprises also an arrangement whereby the grain or other material to be weighed is prevented from flowing from the chute into the bucket, excepting when the bucket-closer is fully shut, thus remedying a serious fault with some of the present existing machines, in which as a result of accident or of malicious intent certain parts of the machine might be displaced, so as to allow of the grain flowing in while the bucket-closer is open, thus permitting the grain to pass through the machine for an indefinite length of time without being weighed or registered in any way.

This invention also has for its object the provision of a register or counting mechanism carried upon the bucket mechanism itself and adapted to be operated by the motion of the bucket-closer in such a way that any failure or derangement on the part of the register shall operate to arrest the motion of the bucket-closer, and thereby prevent, through connections hereinafter described, the supply of further material to the machine.

Figure 5:
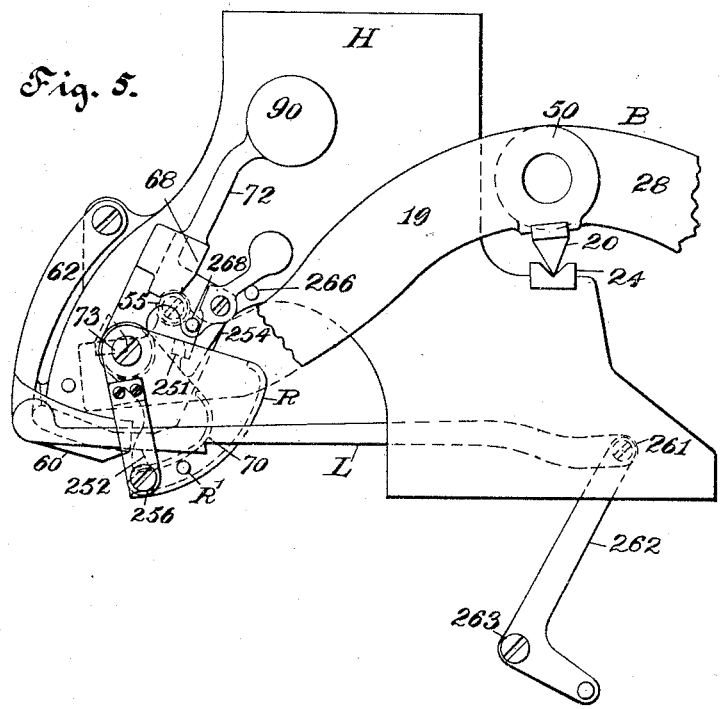
Figure 6:
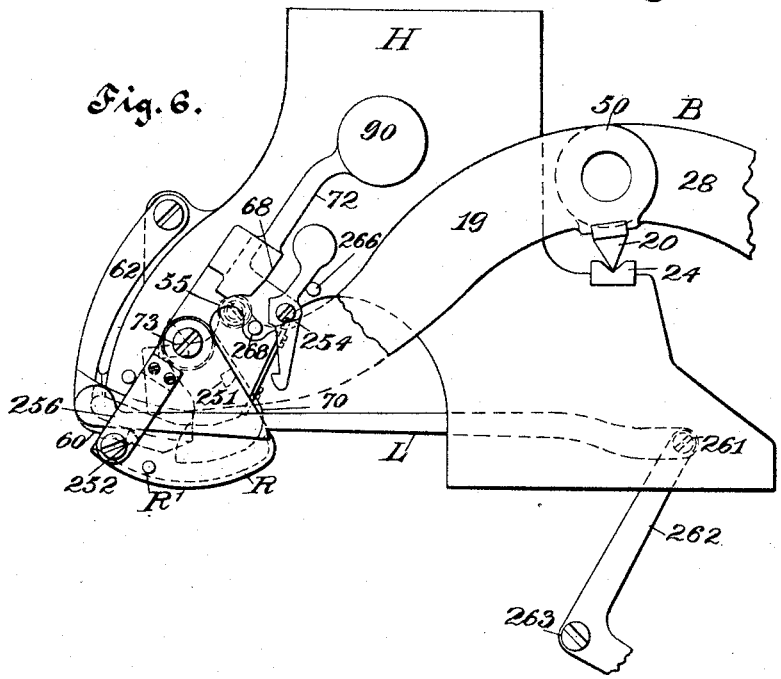
Figure 7:
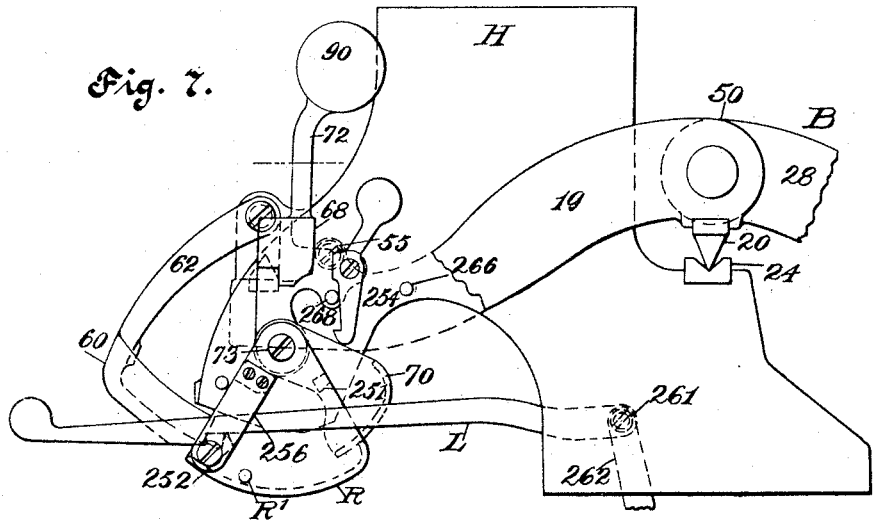
Figure 8:
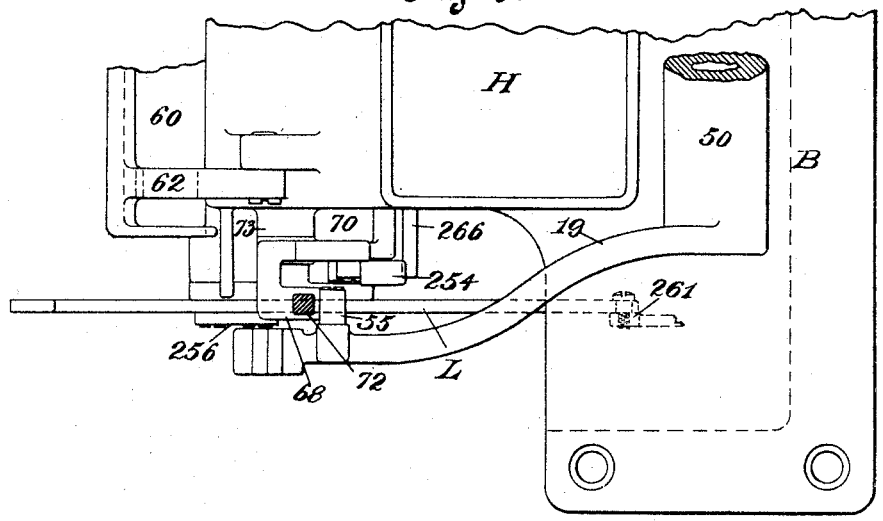
Figure 9:
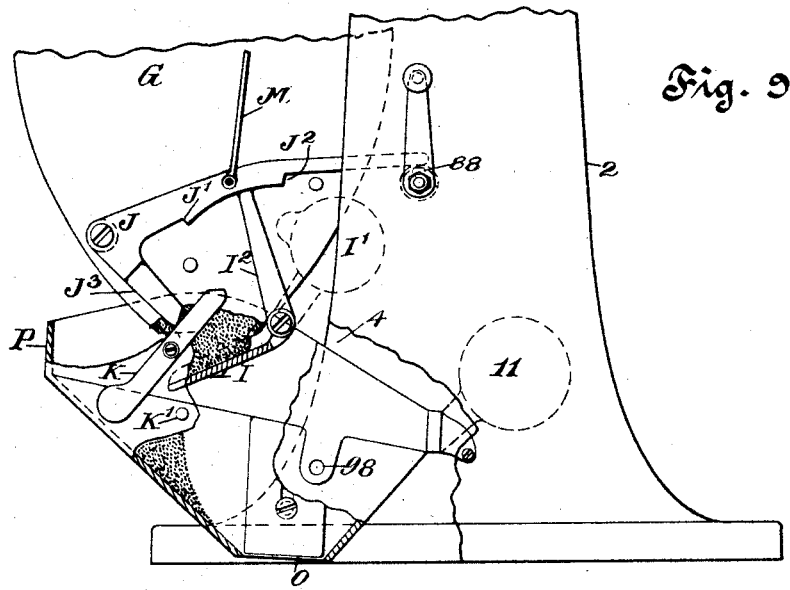
Figure 10:
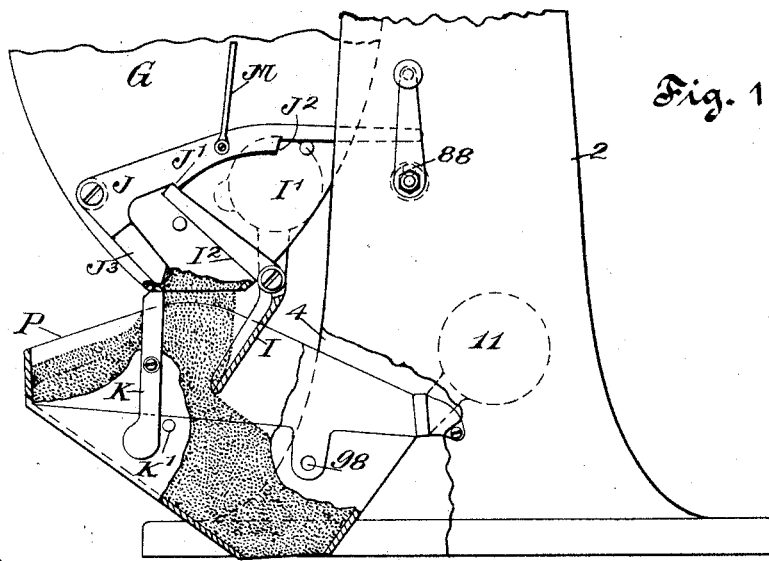
Figure 11:
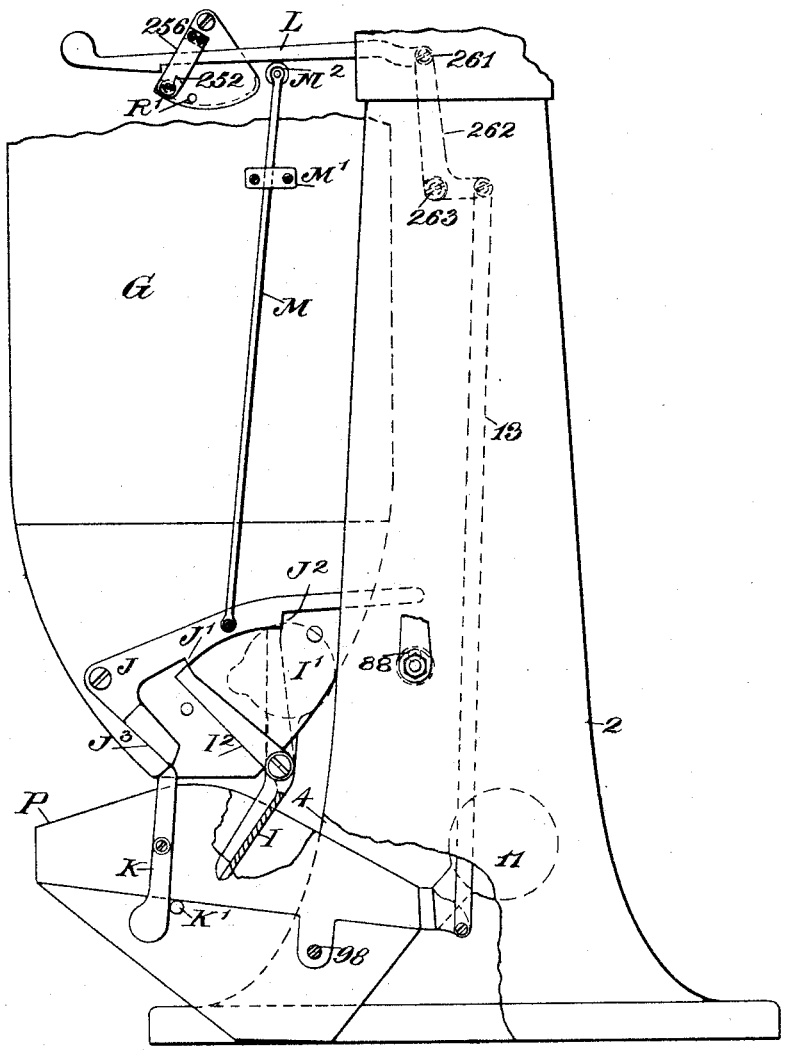
Figure 12:
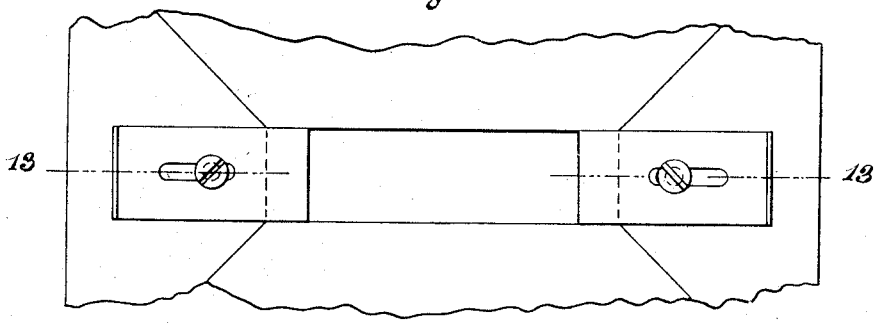
Figure 16:
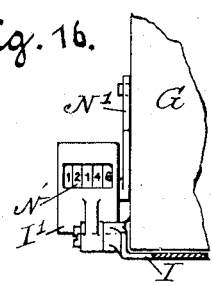
Figure 17:
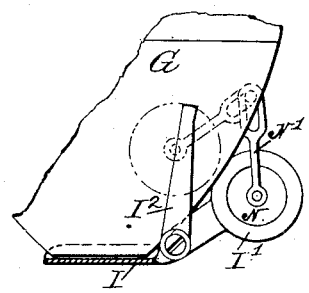

Referring to the drawings which accompany and form a part of this specification, and in which like characters designate like parts throughout the various views, Figure 1 is a front elevation, and Fig. 2 a side elevation, of an automatic scale of the class designated embodying my present invention, a portion of the frame being broken away in Fig. 2 and the parts being shown in their normal positions, with the bucket-closer shut and the supply-valves open ready to commence the filling of the bucket. Figs. 3 and 4 are a front and a side view, respectively, drawn to an enlarged scale, of the upper portion of the machine, the parts which are here shown being in the position represented in Fig. 2. Fig. 5 is a side view of the parts shown in Fig. 4 in the position occupied by them when the bucket is in its poising position, showing the supplemental valve just ready to be released. Fig. 6 is a similar view after the supplemental valve has been released and closed. Fig. 7 is a side view, and Fig. 8 a plan view, of the mechanism shown in the last preceding figures in the positions occupied by them after the bucket has risen, showing the reducing and cut-off valves opened, but with the supplemental valve still closed. Fig. 9 is a side view of the lower portion of the machine, a part of the frame being broken away in order to show the hopper. In this view the parts are shown in the positions occupied by them when the bucket-closer has been unlatched and is swinging open. Fig. 10 is a view similar to Fig. 9, showing the bucket-closer latched in its open position. As shown in this view, enough of the grain has escaped from the bucket into the hopper to carry the latter to its lowest position and to allow the bucket to rise. Fig. 11 is a side view of the parts concerned in the operation of opening the supplemental valve and showing also the means whereby said parts are held out of connection with the valve until the bucket-closer is shut and latched. Fig. 12 is a plan view, and Fig. 13 a side view, in vertical section, taken on the line 13 13 of Fig. 12, showing an arrangement for regulating the size of the opening in the bottom of the hopper. Fig. 14 is a side view showing my improved "drip-plate." Fig. 15 is a similar view showing a modified form of my adjustable drip-plate device and its index. Figs. 16 and 17 are side views of modified arrangements of my safety device, showing it adapted to disconnect the supplemental-valve-operating mechanism of my Patent No. 529,246. Fig. 18 is a front view, and Fig. 19 a rear view, of a modified arrangement of the registering device, showing the register appurtenant to the closer and operating by means of its connection with the bucket.

Although it will be seen that the construction of this machine with its various modifications and adjustments herein shown and described is such that it may be adapted to the automatic weighing of other substances, yet for the sake of clearness and unity of purpose I will herein describe it as adapted to the weighing of grain, it being understood that by proper modification and adjustment it can be made to automatically weigh other granular materials.

Before describing the features which embody my present invention a brief description will be given of those principal features of the machine which are similar to the corresponding features shown and described in my Patent No. 529,246 above referred to. In order that the relation of my present invention to the machine of that patent may be more clearly understood and for greater convenience in referring to the aforesaid patent, I will herein employ the same numerals and other characters which are therein used to designate the corresponding parts.

The general construction and arrangement of the machine as a whole best appear in Figs. 1 and 2, wherein it is shown to be supported upon two side frames 2 and 4, connected at the top by means of the supply-chute H and at the bottom by means of the cross-beam 215. The single-chambered grain-bucket G is suspended beneath the supply-chute H by means of its hangers 16 and 18, which rest, by means of V-shaped bearings, upon the knife-edge pivots 15 and 17, respectively, of the principal arms 19 and 21 of the scale-beam B. This beam is provided with knife-edge pivots 20 and 22, one at each end of the connecting member 50 thereof, which rest in V-shaped bearings 24 on the frame. An arm 28 extends rearwardly from the pivots 20 and is provided with a suitable pivot upon which the main counterweight W is suspended, as best shown in Fig. 2. The hopper P is suspended upon the pivots 98 and 99, attached to the main frames 2 and 4, respectively, and is provided at its ends rearward of the pivots 98 and 99 with the counterweight 11. Attached to this hopper is a connecting-rod 13, the other end of which is connected to the bell-crank 262, pivoted upon the main frame 2 at 263. The reducing-valve 60 is pivoted upon the front of the supply-chute by means of its arms 62 and 64 and is provided with a counterweight 69. The cut-off valve 70 is also pivoted at 73 upon the chute or upon the side frames in corresponding relation to the chute and is provided with a counterweight 90 and with a cam 68, said cam being adapted to be engaged by a roller 55, pivoted directly upon the arm 19 of the beam. The supplemental valve R is also pivoted at 73, concentrically with the location of the cut-off valve 70, and is provided with engaging lugs 251 and 252, the former of which is adapted to be engaged by the detent-latch 254, which is pivoted to a rearwardly-projecting portion of the arm 72 of the cut-off valve 70. The detent-latch 254 is preferably formed with a counterweight, which is so disposed as to urge the detent against the pin 268, which is also fixed in the rearwardly-projecting portion of the arm 72 and operates as a stop to limit the forward position of the latch 254. The valves 60 and 70, which constitute the main-valve mechanism for reducing and for cutting off the flow of grain to the bucket, are directly actuated by and from the scale-beam as a result of the action of the grain-bucket G.

Up to this point the general arrangement, construction, and mode of operation of the mechanism described are similar to those of the corresponding parts of my Patent No. 529,246 above referred to. I will now proceed to describe the construction, arrangement, and mode of operation of those parts which especially form the subject-matter of my present invention.

The bottom of the bucket G, through which its discharging-opening is made, is preferably located in a horizontal plane in preference to being inclined, as shown in my previous patent, and it is provided with the bucket-closer I, pivoted at one side thereof, said bucket-closer having a counterweight I', made sufficiently heavy to considerably overbalance the same. The bucket-closer is also provided with an arm I², the upper end of which is adapted to be engaged by the latch J, pivoted to the side of the bucket and provided with the shoulder J', located to latch the bucket-closer in its open position, (shown in Fig. 10,) and with the shoulder J², located to engage and latch the arm I² when the bucket-closer is in its closed position, as shown in Fig. 2. The lower surface of the latch J describes the arc of a circle struck from the pivot of the bucket-closer I as a center when the latch is in its raised position. (Shown in Fig. 11.) An arm J³ of the latch J projects downwardly and is adapted to be engaged by a pawl K, pivoted on the regulator, shown as a hopper P. The lower end of the pawl K is so counterweighted as to tend to carry it against the stop K', which is fixed on the side of the hopper, the object of the pawl K being to raise the latch J as the forward end of the hopper swings upward from its dot-and-dash position to its full-line position, (shown in Fig. 2,) and that pawl is pivoted so as to allow it to pass by the arm J³ on the return motion of the hopper, as shown in Fig. 9.

The supplemental valve R, mounted as previously described, is in this machine drawn open by means of the supplemental-valve-operating rod L, which is guided in its horizontal movement between the supplemental valve and its guide-plate 256. This rod differs from the nearly-corresponding rod shown in my previous patent in the respect that the hook that operates to pull open the supplemental valve in the machine of the present invention is upon the under side of the rod and in the respect that it is held to its engaging position by its weighted end instead of by a spring, as shown in that patent. Upon the supplemental valve is fixed the pin R', which when that valve is drawn back to the position shown in Fig. 2 operates to raise the rod L out of engagement with its catch 252 and to release the said rod therefrom. This is a very desirable feature, operating, as it does, to positively disconnect the rod from the supplemental valve when the latter has been caught by the detent 254. The rod L is connected to and operated by the bell-crank 262 in substantially the same way as that shown in the patent referred to, excepting that the upper member of the bell-crank to which the rod L is connected is herein shown to be considerably longer than in the other instance, so as to allow of a longer stroke of the rod.

A rod M is jointed at its lower end to the latch J and is guided at its upper end by means of the clip M' on the bucket. The upper end of the rod is provided with a roller M², which is located in the same vertical plane with the operating-rod L, so that the rod L is raised by the roller M² whenever the bucket-closer is in any position intermediate to its extreme positions in which it is engaged by the shoulders J' and J², at all of which intermediate positions the latch J is upheld by the arm I², as shown in Fig. 9. From the description of the operation of the valves given in my Patent No. 529,246 it will be seen that those valves are in the positions shown in Fig. 7 when the other parts of the machine are in the position ready to receive another load in the bucket, and it is only necessary to open the valve R from the position shown in Fig. 7 to that shown in Fig. 2 to permit the stream to flow in from the chute. In the present organization if it should so happen that from any cause the bucket-closer should be arrested in any position intermediate to those in which its arm I² is engaged by the shoulders J' and J² the curved portion of the latch J will rest upon the end of the arm I² and in this position will operate, through the connecting-rod M, to raise the operating-rod L from its position shown in Fig. 7 to that shown in Fig. 11, so that when that rod is drawn back by its connections with the hopper P as said hopper rises said rod will not carry with it the supplemental valve, and the machine will consequently remain at rest. In this connection it is to be noted that as the bucket descends below the poising-line the free end of latch J is prevented from further downward movement with the bucket by coming in contact with the pin 88, (said latch swinging on its pivot,) and the bucket, descending to its limit, will thereby carry the arm I² of the closer below the shoulder J² of the latch, thus permitting the closer to be opened by the weight of the material in the bucket, in which position the closer is latched by the shoulder J', as shown in Fig. 10. Upon the discharge of a small part of the load the bucket of course immediately rises, carrying with it the rod M, which is upheld during the opening movement of the closer, and therefore sustains hook-rod L above the lug 252 on the supplemental valve R. When sufficient material has passed out of the regulator P, the latter gradually rises, and the pawl K', coming into contact with arm J³ of latch J, raises said latch, which releases the closer and permits the same to shut. During the first part of this rising movement of the regulator-hopper and as the pawl K' elevates the latch J the rod M is also elevated and its roller M² holds the hook-rod L out of contact with the lug 252; but when the closer has been unlatched and has closed the latch J drops, withdrawing rod M and permitting rod L to be actuated by the hopper P as it completes its rising movement to open the supply-valve R.

A counting or registering device N' is mounted upon the bucket G, as best shown in Figs. 1 and 2. This consists of the usual counting-wheels arranged side by side and adapted to show in visible numerals the number of times the bucket has been operated. Whatever form of mechanism may be preferred is provided with an actuating-lever N', adapted to oscillate between two fixed stops upon the bucket, which limit its angular motion to the extent necessary to operate the register. The lower end of the lever N' is connected to the counterweight I' or to any other convenient part of the bucket-closer having a suitable direction and extent of motion, the connecting studs and pivots being so located that the complete oscillation of the bucket-closer from one extreme position to the other, as represented by the shoulders J' and J² of latch J, shall, when thus communicated to the lever N', just agree with the necessary angular motion of that lever between its fixed stops. Thus it will be seen that any derangement of the register, whereby its mechanism becomes set so that its lever N' cannot make its full stroke, operates to prevent a full stroke of the bucket-closer I, thereby arresting it at some portion of its stroke intermediate to its positions at which it is engaged by the shoulders J' and J². Whenever the closer is in any such intermediate position, the curved surface of the lever J rests upon the end of the arm I², thereby upholding the connecting-rod M, which is raised, and the operating-rod L, so that the hook of said rod will not engage with and pull open the supplemental valve R when the machine is otherwise in condition to pull open that valve and repeat the filling and weighing operation. Thus it will be seen that the location of the register and the nature of its connection with the bucket-closer will operate to entirely stop the machine whenever any derangement occurs which is serious enough to interfere with the correct and full operation of the register.

A further highly-desirable feature involved in my present arrangement of the register and its actuating means resides in the fact that the register and its actuating means are not thereby directly connected with or operated simultaneously with the supply-valve of the machine. I thereby obviate all danger of arresting the supply-valve midway of its movement in either direction through any derangement or clogging of the register or of the bucket-closer by which it is operated. Any such derangement or clogging would be most likely to occur, if at all, between the ends of their respective movements, and the supply-valve, if connected with the register or its operative means, would thereby be stopped at an open position, thus permitting the grain to flow through the machine for an indefinite period without being weighed or registered. By thus connecting the register directly and positively to the bucket-closer independently of the valve mechanism I am enabled to entirely close the bucket before opening the supply-valve for the next load. Furthermore, by combining these devices with means for holding the valve mechanism disconnected, and thus retaining the valve in its closed position until the bucket-closer is fully shut, I am enabled to entirely stop both the operation of the machine and the unweighed flow of grain whenever either the register or the bucket-closer fails to properly fully perform its function.

Figure 13:
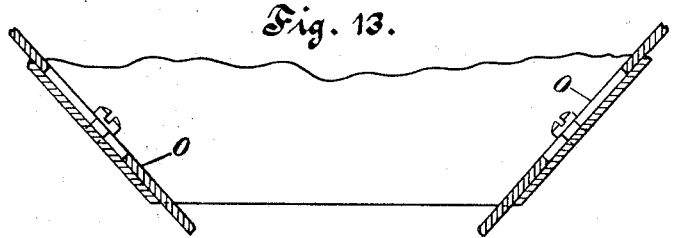

The means whereby I regulate the width of opening through which the grain flows out of the hopper, so as to vary the time required for it to empty, and consequently regulate the interval between the recurring operations of the machine, is best shown in enlarged scale in Figs. 12 and 13, and consists, preferably, of a slide or slides O, arranged on one or more sides of the inclined surfaces of the hopper, so as to extend those surfaces to the extent to which it is desired to contract the opening in the hopper. These slides are preferably mounted upon the inside of the hopper and are provided with slots through which pass screws, by which the slides are attached to the sides of the hopper. The particular utility resident in this arrangement for adjusting the opening in the hopper is in the fact that no angular pockets or corners are formed by the slides that will afford lodgment for the passing grain and upon which the grain might so accumulate as to clog or perhaps entirely close the opening.

The mode of operation of this machine may be described as follows: When in the position shown in Fig. 2, the machine is ready to receive the first part of its load of grain. The supplemental valve having been pulled open, the closer locked in its closed position by means of the latch J, and the three inlet-valves being open, the grain flows rapidly from the supply-chute into the bucket. When the larger portion of the desired load has fallen into the bucket, the beam descends to its poising-point. (Shown in Fig. 5.) This descent of the beam allows the reducing-valve 60 to close, thereby reducing the flow of the grain to a small stream or "drip." When the full load is made up by the drip, the beam further descends and the cut-off valve 70 is closed. On the descent of the beam below the poising-point the further downward movement of latch J, with the bucket, is restrained by the contact of its rear end with pin 88, and the bucket descending to its limit the bucket-closer is unlocked. That closer is then opened wide by the weight of the grain in the bucket and locked in its wide-open position by means of the shoulder J' of the latch J, as shown in Fig. 10. Just before the scale-beam reaches its lowest position the supplemental valve R is released from its latch 254 by the engagement of the latter with the pin 266, and the said valve is allowed to descend to its closed position. (Shown in Fig. 6.) As the grain discharges from the bucket into the hopper P, the latter having an emptying capacity a little less than that of the bucket, the hopper is tilted into the position shown in Figs. 10 and 11. This movement of the hopper operates, through the medium of the connecting-rod 13 and bell-crank 262, to return the operating-rod L to its forward position, (shown in Figs. 7 and 11,) thus placing it in position to engage with and open the supplemental valve R upon the reverse movement of the hopper and connecting-rod. During this downward movement of the front of the hopper its pawl K moves from the position shown in Fig. 9 to that shown in Fig. 10, passing by the arm $J^3$ of the latch-lever J in its descent. As the grain is discharging the lessening weight thereof permits the bucket with its scale-beam to rise to the position shown in Fig. 2, and during this movement of the mechanism the reducing-valve and the cut-off valve are opened in the way shown and described in connection with the similar mechanism of my above-mentioned patent No. 529,246, leaving the supplemental valve in its closed position, (shown in Fig. 7,) with its operating-rod L resting in contact therewith, ready to draw the supplemental valve open. After the grain is wholly discharged from the bucket into the hopper the latter rests in its downward position until enough grain has been discharged from it to allow it to rise. As the hopper rises its pawl K is carried against the arm $J^3$ of the latch-lever and operates to raise it from the latched position shown in Fig. 10 to the unlatched position shown in Fig. 11, thus permitting the weight I' to shut the bucket-closer, in which position said closer is held as the shoulder J² of the latch J drops behind it, as shown in Fig. 2. As the arm I² is carried through this closing movement of the bucket-closer from the position shown in Fig. 11 to that shown in Fig. 2 the latch J is held in its upward position, operating, therefore, by means of its connecting-rod M and roll M², to hold the rod L above its engaging position with relation to the catch 252' of the supplemental valve R; but when the bucket-closer is entirely shut and the shoulder J² of the latch J drops behind the arm I² the rod M and roll M² are also lowered and allow the rod L to rest upon the catch 252' of the supplemental valve, so that said valve is drawn open by the continued movement of the hopper communicated to the rod L by means of the rod 13 and cranked arm 262.

By a comparison of Figs. 2 and 11 it will be seen that if the movement of the bucket-closer were to be arrested—as, for instance, in the dotted position shown in Fig. 11—and no material should escape from the bucket the parts would remain in their depressed positions, with all of the supply-valves closed; but should the movement of the closer be arrested at such a position relatively to the opening in the bottom of the bucket that material could pass from said bucket the bucket will immediately rise, and the latch J being upheld by the arm I² of the closer the rod M and roll M² will be raised with the bucket and will therefore operate to hold the rod L in a plane above that in which it engages with the catch 252 on the supplemental valve R, so that an upward movement of the regulator or hopper P and the consequent backward movement of the bell-crank 262 and rod L would not operate to open the supplemental valve and the operation of the machine would be fully stopped until the difficulty was removed or the obstructing cause remedied.

For convenience of comparison with the machine of Patent No. 529,246 I have herein designated the valve R as the "supplemental valve." It is obvious, however, that my improved means of connecting and disconnecting the operating mechanism for that valve is not dependent in any way upon the fact of the presence or absence of the other valves 60 and 70, shown in said patent. When these other valves are both opened, as shown in Fig. 7, the so-called "supplemental valve" still operates to shut off the supply of grain from the chute as fully as though it were the only valve employed. For this reason and in order to avoid the implication of being limited in the application of this device to the particular form of mechanism herein shown I propose in some of the claims to designate the valve R as the "supply-valve," inasmuch as I know of no instance in the prior art in which the incorrect position or improper working of the other portions of the machine have been utilized to disconnect the supply-valve and its operating mechanism, and thereby stop the operation of the machine. The general principle of the safety disconnecting device herein shown is capable of application to machines employing other forms of supply-valves. In Fig. 14 is shown an adaptation of this safety disconnecting device to the supply-valve-operating mechanism of my above-mentioned Patent No. 529,246. In this arrangement the connecting-rod M is pivotally attached to a member of the arm J, which projects beyond its pivot for the purpose of imparting motion to said rod in the desired direction, inasmuch as the rod 257 must be pulled downward in order to disconnect it from its catch 252'. In other respects the mode of operation of the parts is the same as that above described. One of the principal reasons for the arrangement of the rod L in the present invention is to dispense with the spring 259 and to enable it to rest by gravity upon its engaging catch 252'. This arrangement also enables me to make a more direct and simple connection between the latch J and the rod L. In Fig. 15 is shown another adaptation of my present safety disconnecting device to the supply-valve mechanism of my above-mentioned patent. In this arrangement the connecting-rod M is jointed to the latch J at substantially the same position shown in the other sheets of these drawings, and its motion is reversed by means of the lever M⁸, pivoted upon the bucket. In this case, also, as in Fig. 14, the roller rests upon the top of the rod 257, but at a point nearer to the point of connection of that rod with its bell-crank 262. The mode of operation of this arrangement is substantially the same as those already described.

In the construction, location, and arrangement of the several parts of this machine due attention must be paid to the relative movements of the rod 13 and the rod M. The longitudinal position of the hook upon the rod L must be such that in the normal and usual operation of the machine it will not pass by catch 252' of valve R until after the shoulder J² of the latch J falls behind the arm I. The dropping of the latch J and the consequent fall of the rods M and L are indications that the bucket-closer is latched in its closed position ready for another load and at this time the hook of the rod L must still be in advance of the catch 252'.

A modified arrangement of my registering device with relation to the bucket mechanism is shown in Figs. 16 and 17. In this arrangement the register is appurtenant to the bucket closer, and, as shown in the drawings, it may be incased within the counterweight of the bucket-closer and be provided with suitable indicating-numerals, which may be read from any convenient part of the machine.

The term "bucket mechanism" as herein employed is to be understood as referring to the bucket and to the parts which are appurtenant thereto and move therewith to weigh grain, but not including the registering mechanism, which counts the weighing done by the bucket mechanism.

I claim as my invention—

1. In a weighing-machine, in combination with the bucket and the bucket-closer thereof, a latch pivotally mounted upon the bucket and provided with two shoulders adapted to latch the bucket-closer in its open and in its closed positions, said latch having an extended member adapted to be engaged by a stationary pin of the machine as the bucket is carried down by the weight of its load, and having also an extended member adapted to be engaged by releasing devices connected with the regulator.

2. In a grain-weigher of the class specified, in combination with the grain-supply valve thereof, provided with an engaging catch, the herein-described valve-operating rod, adapted to rest in engagement with the catch of the supply-valve, and an engaging lug attached to or integral with the valve, so located thereon as to raise its operating-rod out of engagement with its catch at the completion of the valve-opening operation.

3. In a grain-weigher of the class specified, in combination with the grain-supply valve thereof, the latter being provided with catches adapted to be engaged by its detent and by its operating-rod respectively, the herein-described valve-operating rod adapted to rest in engagement with its catch upon the supply-valve, and adapted to communicate to that valve, by means of its catch, a sufficient opening movement, and a projecting lug carried by the valve, arranged and adapted to lift the operating-rod out of engagement with its catch when that rod has carried the valve to the position in which it is safely engaged by its detent.

4. In a grain-weigher, in combination with the supply-chute and bucket thereof, and with a valve adapted to close the opening in the chute, provided with a catch adapted to be engaged by a valve-opening device, the herein-described valve-opening device adapted normally to rest in engaging relation to the catch of the valve, and a disengaging device operatively connected with the bucket, and adapted to engage with the valve-opening device to lift it out of engaging relation to the valve, for the purpose specified.

5. In a weighing-machine, in combination with valve mechanism, and with a bucket having a closer, of means operative with the closer, adapted to disconnect said valve mechanism whenever the closer is between its two latching positions, substantially as described.

6. In a weighing-machine, in combination with valve mechanism, and with a bucket having a closer, a latch adapted to latch the closer in its open and in its closed positions, and adapted to be raised at all other positions of the closer, with the herein-described means operative with the latch, adapted to disengage the valve mechanism when the latch is raised, in the manner specified.

7. The combination, with weighing mechanism embodying a bucket having a closer, of closer-holding means including a latch; a valve; means for raising said latch, thereby to release the closer; a rod in position to be lifted by the latch when the latter is raised; guiding means for said rod; and a valve-controller shiftable by said rod when the latter is lifted by the latch.

8. The combination, with weighing mechanism embodying a bucket having a closer, of closer-holding means including a latch; a valve; means for actuating said latch; a rod in position to be operated by the latch; and a valve-controller shiftable by said rod when the latter is actuated by the latch.

9. The combination, with a bucket having a closer, of closer-holding means embodying a member having a catch and connected with the closer and a latch adapted to engage said member, one of said closer-holding parts having a bearing-face adapted to be engaged by the other closer-holding part on the opening of said closer; a valve; valve-controlling means shiftable by the latch when in its elevated position; and means for holding the latch in such position when the closer is between its latching positions, and operating to prevent an opening movement of the valve.

10. The combination, with a bucket, of a closer having a catch mounted on the bucket; a latch adapted to engage said catch; a valve; valve-controlling means shiftable by the latch when in its elevated position; and means for holding the latch in such position when the closer is between its two latching positions, and operating to prevent an opening movement of the valve.

11. The combination, with weighing mechanism including a bucket having a closer, of a latch; a catch connected with the closer and adapted to be held by the latch; a rod; valve-controlling means shiftable by the rod when said latch is in its elevated position; and means for holding the latch in such position when the closer is between its latching positions, and operating when shifted to prevent an opening movement of the valve.

12. In a weighing-machine, in combination with the valve mechanism, and with a bucket-closer latch adapted to disconnect the valve mechanism when the latch is in its raised position, the herein-described bucket-closer, having an arm adapted to engage with and hold the latch in its raised position at all times excepting when the bucket-closer is either fully open or fully closed, substantially as described.

13. In a weighing-machine, in combination with a bucket having a closer, and with an oscillating regulator, a latch pivotally mounted upon the bucket and adapted to latch the bucket-closer in its open position, and a pawl pivotally mounted upon the regulator and adapted to raise the bucket-closer latch at the upward oscillation of the regulator, substantially as described.

14. In a weighing-machine, in combination with the valve mechanism, and with an oscillating regulator, adapted to operate said valve mechanism, the herein-described pawl pivotally mounted upon the regulator, and means substantially as described whereby the valve mechanism is disengaged by the pawl at the first part of the movement of the regulator, substantially as described.

15. In a weighing-machine, in combination with the bucket, its closer, and a latch therefor, a regulator pivotally mounted below the bucket, and adapted to be operated by the discharge of the grain from the bucket, and a pawl pivotally mounted upon the regulator, adapted to pass by without operating the bucket-closer upon the downward movement of the regulator, and operating to raise that latch and release the bucket-closer upon the upward movement of the regulator, substantially as described.

16. The combination, with a bucket provided with a closer shiftable to discharge a load, of locking means located and operable for locking said closer in its load-discharging position; a load-receiving regulator shiftable in one direction by the discharging load; and a device located and connected to have descending and ascending movements with the regulator, and thereby operable to engage and unlock said locking means from said closer when this is in its load-discharging position, and on the ascending movement of said device and the regulator.

17. The combination, with weighing mechanism including a closer, shiftable to discharge a load, a load-receiving regulator; a latch and a latch-actuator, the latch being mounted to hold said closer in its load-discharging position, and the latch-actuator being mounted directly upon the regulator, said parts being constructed to permit the latch-actuator to pass by the latch without operating the same on the downstroke of the regulator and to trip said latch to permit the closer to resume its normal position on the upstroke of said regulator.

18. The combination, with a bucket provided with a closer shiftable to discharge a load, of a regulator shiftable in one direction by the discharging load; and a latch and a latch-actuator mounted, respectively, upon the load-receiver and the regulator, one of said parts being so constructed that the latch-actuator will pass by the latch without tripping the latter on the downstroke of the regulator and will trip said latch on the upstroke of the regulator and thereby release the closer.

19. The combination, with weighing mechanism, embodying a bucket provided with a closer shiftable for discharging the load; of controlling means carried by the bucket and adapted to lock the closer shut and also to lock said closer open; and regulating mechanism embodying an actuator-pawl adapted to engage a part of said controlling means and thereby unlock the closer from its open-lock position and permit the same to shut.

20. The combination, with a load-receiver, of a closer therefor; a latch for locking the closer open; valve mechanism for regulating the supply of material to said receiver; a regulator shiftable in one direction by the discharging load; connections between the regulator and valve mechanism for operating the latter on one stroke of the regulator; and means operative with the regulator and supported independently of said connections for actuating the latch on the ascending movement of the regulator.

21. The combination, in a weighing-machine having a supply-valve, of an actuator for said valve; a register normally operated independently of the valve; and means intermediate the register and the supply-valve, operating to prevent the valve-actuator from engaging with the valve to open the same upon the abnormal or incomplete operation of the register.

22. The combination, in a weighing-machine having a bucket mechanism, and having an independently-operated supply-valve, of a valve-actuator; a register operatively connected with the bucket mechanism; and means intermediate the register and the supply-valve operating to prevent the valve-actuator from engaging with the valve upon the abnormal or incomplete operation of the register.

23. In combination, a weighing-machine having a bucket mechanism and a supply-valve; a valve-actuator normally independent of the bucket mechanism, for opening the supply-valve; a registering device mounted upon one part of the bucket mechanism with the operating-arm thereof positively connected with another and relatively movable part of that mechanism; and means operable with the bucket mechanism for preventing the valve-actuator from engaging with the valve upon the abnormal or incomplete operation of the registering device or of the bucket mechanism.

24. In a grain-weigher, the combination, with a valve, a valve-actuator, and means for operating the same; of bucket mechanism; a registering or counting device carried upon the bucket mechanism and operatively connected with the bucket-closer independently of the valve-operating mechanism; and means operable with the bucket mechanism whereby the valve-actuator is held disengaged from the valve whenever the movement of the registering device is arrested between the extremes of its movement.

25. In a grain-weigher, the combination, with a supply-valve and with bucket mechanism, of a valve-actuator; a registering or counting device, carried upon the bucket mechanism and operatively connected with the bucket-closer; and means substantially as described operable with the bucket mechanism, whereby the valve-actuator is held out of engagement with the supply-valve whenever the movement of the registering device is arrested between the extremes of its movement.

CHARLES H. COOLEY.

Witnesses:
A. MUTTER,
JENNIE NELLIS.